(12) United States Patent
Komatsu et al.

(10) Patent No.: US 6,437,940 B1
(45) Date of Patent: Aug. 20, 2002

(54) FLOPPY DISK DRIVE WHICH PREVENTS CONTACT BETWEEN A DISK CARTRIDGE AND MAGNETIC HEADS UNTIL THE DISK CARTRIDGE IS LOADED FROM A LOADING PORTION TO A RECORDING/ REPRODUCING PORTION

(75) Inventors: Hisateru Komatsu, Tendo; Makoto Takahashi, Obanazawa; Noriyuki Kobayashi, Yamagata, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 115 days.

(21) Appl. No.: 09/664,729

(22) Filed: Sep. 19, 2000

(30) Foreign Application Priority Data

Sep. 27, 1999 (JP) .......................................... 11-271835

(51) Int. Cl.$^7$ .............................................. G11B 17/02
(52) U.S. Cl. .................................................... 360/99.02
(58) Field of Search ........................... 360/99.02, 99.05, 360/99.06

(56) References Cited

U.S. PATENT DOCUMENTS 5,583,716 A * 12/1996 Akiba et al. ............. 360/99.01
5,610,781 A * 3/1997 Watanabe ................. 360/99.06
5,629,819 A * 5/1997 Kitano ..................... 360/99.02
5,956,205 A * 9/1999 Konno et al. ............. 360/99.02
5,956,206 A * 9/1999 Kabasawa et al. ........ 360/99.06
6,301,215 B1 * 10/2001 Otsuki et al. .............. 369/77.2
6,320,724 B1 * 11/2001 Suzuki ..................... 360/99.02

* cited by examiner

Primary Examiner—Jefferson Evans
(74) Attorney, Agent, or Firm—Whitham, Curtis & Christofferson, PC

(57) ABSTRACT

A cam plate member 24 is provided such that it is supported by a lower chassis 8 so as to rotate freely and rotates in accordance with the inserting/ejecting operation of a disk cartridge 5. The cam plate member 24 includes an elastic cam lever portion 24f and a cam convex portion 24g which are formed integrally. The elastic cam lever portion serves to push up the disk cartridge thereby to prevent hitting between the disk cartridge and a magnetic head 6 until the disk cartridge 5 that is inserted is loaded to a recording/ reproducing portion 17 after the state where the disk cartridge moves onto a guide convex portion 14 formed at the lower chassis 8. The cam convex portion serves to push up and hold a portion 28 of a holder 10 which holds and loads the disk cartridge 5 from a portion 4 of the recording/ reproducing portion 17 thereby to prevent the cartridge holder from being bent due to vibration.

2 Claims, 7 Drawing Sheets

FLOPPY DISK DRIVE WHICH PREVENTS CONTACT BETWEEN A DISK CARTRIDGE AND MAGNETIC HEADS UNTIL THE DISK CARTRIDGE IS LOADED FROM A LOADING PORTION TO A RECORDING/REPRODUCING PORTION

BACKGROUND OF INVENTION

1. Field of Invention

The present invention relates to a floppy disk drive and, more particularly, relates to a floppy disk drive which is constituted in a light-weight and thin-thickness configuration and arranged so that a disk cartridge is surely held in a non-contact state with a magnetic head until the disk cartridge inserted is loaded from a loading portion to a recording/reproducing portion.

2. Related Art

A floppy disk drive employs a disk cartridge for housing a floppy disk so as to rotate freely therein and is generally used as an external storage device etc. of a personal computer, for example. The floppy disk drive is arranged in a manner that, when the recording/reproducing operation is performed in a state that the disk cartridge is loaded, an information signal etc. is recorded on or an information signal etc. recorded is reproduced from the floppy disk by a magnetic head.

The disk cartridge is arranged to house the floppy disk so as to freely rotate within a cartridge of a thin box shape formed by combining a pair of upper and lower cartridge halves. The disk cartridge is arranged in a manner that at the center portion of one of the cartridge halves, a circular opening portion is formed so as to face a center hub to the outside which fits with the center portion of the floppy disk housed therein. The disk cartridge is further arranged in a manner that the pair of cartridge halves are provided with recording/reproducing opening portions for facing parts of the major and rear surfaces of the floppy disk to the outside from the outer peripheral portion to the inner peripheral portion thereof. A shutter member is assembled to the disk cartridge so as to be able to slide freely such that the shutter member is provided with a property for closing the recording/reproducing opening portion by a spring etc.

The floppy disk drive is arranged in a manner that when the aforesaid disk cartridge is loaded in the loading portion, the disk cartridge is held within a cartridge holder which supports the disk cartridge within a base frame so as to slide freely, and then the disk cartridge is loaded to the recording/reproducing portion through the cartridge holder. The floppy disk drive is provided at the recording/reproducing portion with a disk driving mechanism which includes a disk table, a driving motor etc. and is arranged to magnetically chuck the center hub which moves therein from the circular opening portion of the cartridge.

The floppy disk drive is further provided at the recording/reproducing portion with the pair of magnetic heads which face on the major and rear surfaces of the floppy disk from the recording/reproducing opening portions of the disk cartridge. The magnetic heads are formed by a first magnetic head which is supported through a gimbal spring by a carriage attached to a lower chassis constituting the bottom surface of the recording/reproducing portion and a second magnetic head which is supported by a carriage through the gimbal spring so as to sandwich the floppy disk between the first and second magnetic heads. In the second magnetic head, the carriage is supported by a head supporting mechanism, and the head supporting mechanism is supported by an upper chassis so as to swing freely so that the positions where the head supporting mechanism moves into and moves out of the recording/reproducing portion can be changed.

The magnetic heads are arranged in a manner that the carriages thereof are supported by guide mechanisms, respectively, and the magnetic heads move in a radial direction on the major and rear surfaces of the floppy disk by a driving motor such as a stepping motor, a voice coil motor etc. thereby to perform a seek operation. The floppy disk drive generally includes the aforesaid second magnetic head configuration when it is arranged to have such a specification for recording and reproducing the information signal etc. only on and from one of the major and rear surfaces of the floppy disk.

The floppy disk drive includes a shutter opening mechanism having a shutter opening member which drives a shutter member to open the recording/reproducing opening portions at the time of loading the disk cartridge to the recording/reproducing portion. The floppy disk drive further includes an eject mechanism having an eject lever member which slides along the chassis and is locked at a predetermined position in response to the loading operation of the disk cartridge, and is released from the locking state to thereby eject the disk cartridge loaded at the recording/reproducing portion to the loading portion in response to an ejecting operation.

In the floppy disk drive, as described above, the disk cartridge loaded from the loading portion is held by the cartridge holder and loaded to the recording/reproducing opening portions. In this respect, the shutter opening mechanism drives the shutter member to open the recording/reproducing opening portions on the way of loading the disk cartridge to the recording/reproducing opening portions. The floppy disk drive is arranged to move the disk cartridge horizontally from the loading position to the predetermined position and thereafter shifts the disk cartridge in the vertical direction at the position corresponding to the recording/reproducing opening portions. The floppy disk drive is further arranged to perform the locking operation of the eject lever member when the disk cartridge shifts in the vertical direction.

The floppy disk drive is arranged to avoid the hitting between the disk cartridge and the first magnetic head by shifting the disk cartridge in the vertical direction as described above. The floppy disk drive is further arranged to avoid the hitting between the disk cartridge and the second magnetic head by holding the second magnetic head to the evacuated state from the recording/reproducing portion by means of the head supporting mechanism until the disk cartridge is loaded in the recording/reproducing portion.

The floppy disk drive is arranged in a manner that when the disk cartridge is loaded in the recording/reproducing portion, the disk table entering from the opening portion magnetically chucks the center hub thereby to position and hold the floppy disk. In the floppy disk drive, the first and second magnetic heads are positioned in correspondence to the opened recording/reproducing opening portions. The floppy disk drive is further arranged in a manner that when the recording/reproducing operation is performed in this state, the driving motor of the disk driving mechanism is started to drive and rotate the floppy disk, whereby the information signal etc. is recorded or reproduced by the magnetic head.

The floppy disk drive is arranged in a manner that when the predetermined recording/reproducing operation is completed and the ejecting operation is performed, the locking state of the eject lever member is released, whereby the cartridge holder is restored to the loading portion from the recording/reproducing portion to perform the ejecting operation of the disk cartridge. In this case, the floppy disk drive is arranged not only to release the magnetic chucking state of the center hub by the disk table but also to release the opening state of the shutter member by a shutter release member, thereby to perform the ejecting operation such that the disk cartridge is restored to the initial state and to protrude the one end portion thereof from the loading portion.

The floppy disk drive has been intended to be miniaturized and be thin in thickness due to the miniaturization etc. of the main body apparatus of a personal computer etc. In the floppy disk drive, the constructive members such as the main chassis, the cartridge holder, the eject member etc. are formed by the press processing by using a light-weight thin metal plate as the material. The floppy disk drive has been constituted with the requirement of the thinning by forming the respective constituent members using materials with thin thickness. In the floppy disk drive, it is possible to improve the mechanical performance of the constructive members by suitably forming ribs etc. at the constructive members. However, since performance is limited to a certain extent when merely such a method is employed, material with a certain thickness is employed as the constructive members.

Further, in the floppy disk drive, the attention is directed to the clearances between the respective constructive members and the disk cartridge to be loaded and the measures for setting the clearances to the minimum values have been attempted. In the case of constituting the floppy disk drive so as to set the clearances at the respective constructive members to the minimum values, it is required to form the respective constructive members with high accuracy in their sizes and to assemble them with a high accuracy.

However, as described above, in the floppy disk drive, the loading operation is performed in a manner that the disk cartridge is moved horizontally to the predetermined position and shifted in the vertical direction at the position corresponding to the recording/reproducing portion. In the floppy disk drive, it is required to provide a cartridge push-up member for holding the disk cartridge in a pushed-up state so as to avoid the hitting between the disk cartridge and the first magnetic head until the disk cartridge is moved to the position corresponding to the recording/reproducing portion. The cartridge push-up member is required to move away from the position to release the push-up state of the disk cartridge when the disk cartridge reaches the position corresponding to the recording/reproducing portion.

Further, in the floppy disk drive, since the constructive members such as the main chassis, the cartridge holder etc. are formed by using a relatively thin metal plate as the material, there may arise such a phenomenon that, for example, the cartridge holder bends due to the shock etc. to hit the first and the second magnetic heads with the disk cartridge to thereby break the heads. Thus, in the floppy disk drive, it is considered to provide a holding member for holding the cartridge holder to suppress the occurrence of the bending thereof. Such a holding member holds the cartridge holder not only when the cartridge holder is not loaded but also at least until the disk cartridge being loaded is moved to the position corresponding to the recording/reproducing portion. Further, the holding member is required to move away from the 77 position when the disk cartridge moves to the position corresponding to the recording/reproducing portion.

In this manner, the floppy disk drive is required to include members such as the aforesaid cartridge push-up member, the cartridge holder holding member etc. in the case of attempting to realize the miniaturization and the thin thickness, so that there arises a problem that the number of the parts and the number of the assembling processes increase. Further, since the floppy disk drive requires a space for assembling the cartridge push-up member, the cartridge holder holding member etc. within the chassis, the realization of the miniaturization and the thin thickness is limited to a certain degree.

SUMMARY OF INVENTION

Accordingly, an object of the invention is to provide a floppy disk drive which is constituted in a miniaturized and thin-thickness configuration and arranged so that magnetic heads are mutually held in a non-contact state or a disk cartridge is surely held in a non-contact state with the magnetic heads until the disk cartridge inserted is loaded from a loading portion to a recording/reproducing portion.

In order to attain the object, the floppy disk drive according to the invention includes a cam plate member which is supported by a chassis so as to rotate freely and rotates in accordance with an inserting/ejecting operation of a disk cartridge. The cam plate member is integrally provided with an elastic cam lever portion and a cam convex portion. The elastic cam lever portion pushes up the disk cartridge being loaded in a manner of being moved onto a convex portion formed on the chassis and the [cum] cam convex portion pushes up and holds the cartridge holder which holds and loads the disk cartridge from a loading portion to the recording/reproducing portion.

According to the floppy disk drive of the invention thus configured, the cam plate member is rotated by the disk cartridge loaded from the loading portion. According to the floppy disk drive, the elastic cam lever portion of the cam plate member holds the riding state of the disk cartridge onto the convex portion of the chassis until the disk cartridge is loaded to the recording/reproducing portion from the loading portion, so that the pushing-up state of the disk cartridge is held by the elastic cam lever portion. In the floppy disk drive, when the disk cartridge reaches the position corresponding to the recording/reproducing portion, the elastic cam lever moved to the bottom surface of the recording/reproducing portion from the convex portion of the chassis by the rotating operation of the cam plate member thereby to release the disk cartridge having been pushed up. Thus, in the floppy disk drive, the disk cartridge is loaded to the recording/reproducing portion. Accordingly, in the floppy disk drive, the disk cartridge can be held in a state being surely separated from the magnetic head until the disk cartridge is loaded to the position corresponding to the recording/reproducing portion from the loading position, whereby the magnetic head can be prevented from being broken due to the hitting etc. with the disk cartridge.

Further, according to the floppy disk drive, the cam convex portion of the cam plate member holds the cartridge holder until the disk cartridge is loaded to the position corresponding to the recording/reproducing from the loading position. In the floppy disk drive, when the disk cartridge reaches the position corresponding to the recording/reproducing portion, the holding state of the cartridge holder by the cam convex portion is released in response to the rotating operation of the cam plate member, so that the cartridge holder, that is, the disk cartridge is loaded to the recording/reproducing portion. Thus, in the floppy disk drive, the cartridge holder is held until the disk cartridge is loaded to the position corresponding to the recording/reproducing portion from the loading position, so that the occurrence of the bending of the cartridge holder is suppressed even if vibration or impact etc. is applied to the cartridge holder thereby to prevent the occurrence of the breakages of the magnetic head due to hitting etc. with the disk cartridge. Further, in the floppy disk drive, even when the disk cartridge is loaded, the occurrence of the bending or deformation of the cartridge holder due to the vibration or impact etc. applied thereto can be surely prevented.

DETAILED DESCRIPTION OF PREFERRED EMBODIMENTS

Figure 1:
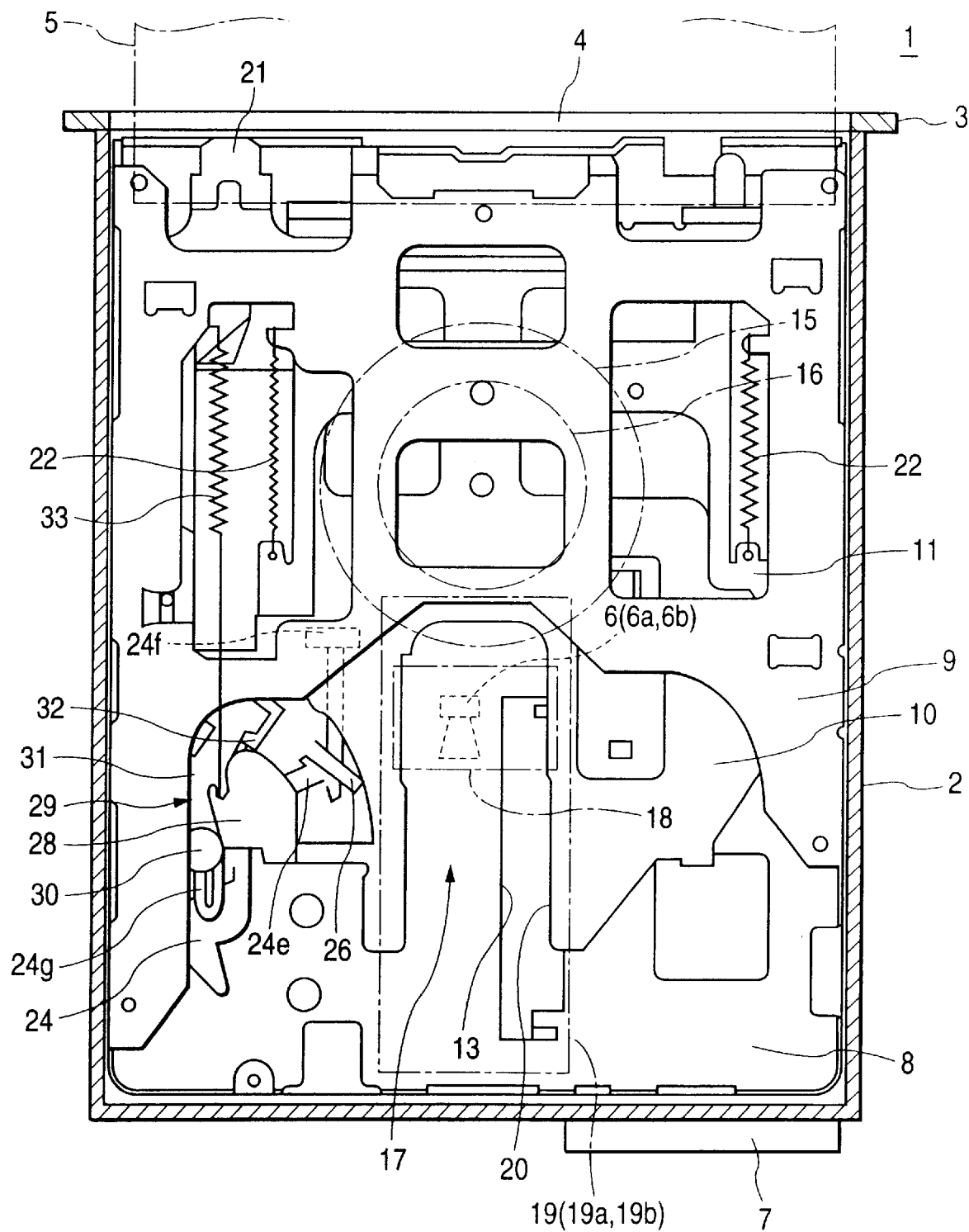
FIG. 1 is a plan view of a floppy disk drive according to an embodiment of the invention in which the. casing thereof is partially cut away.
Figure 3:
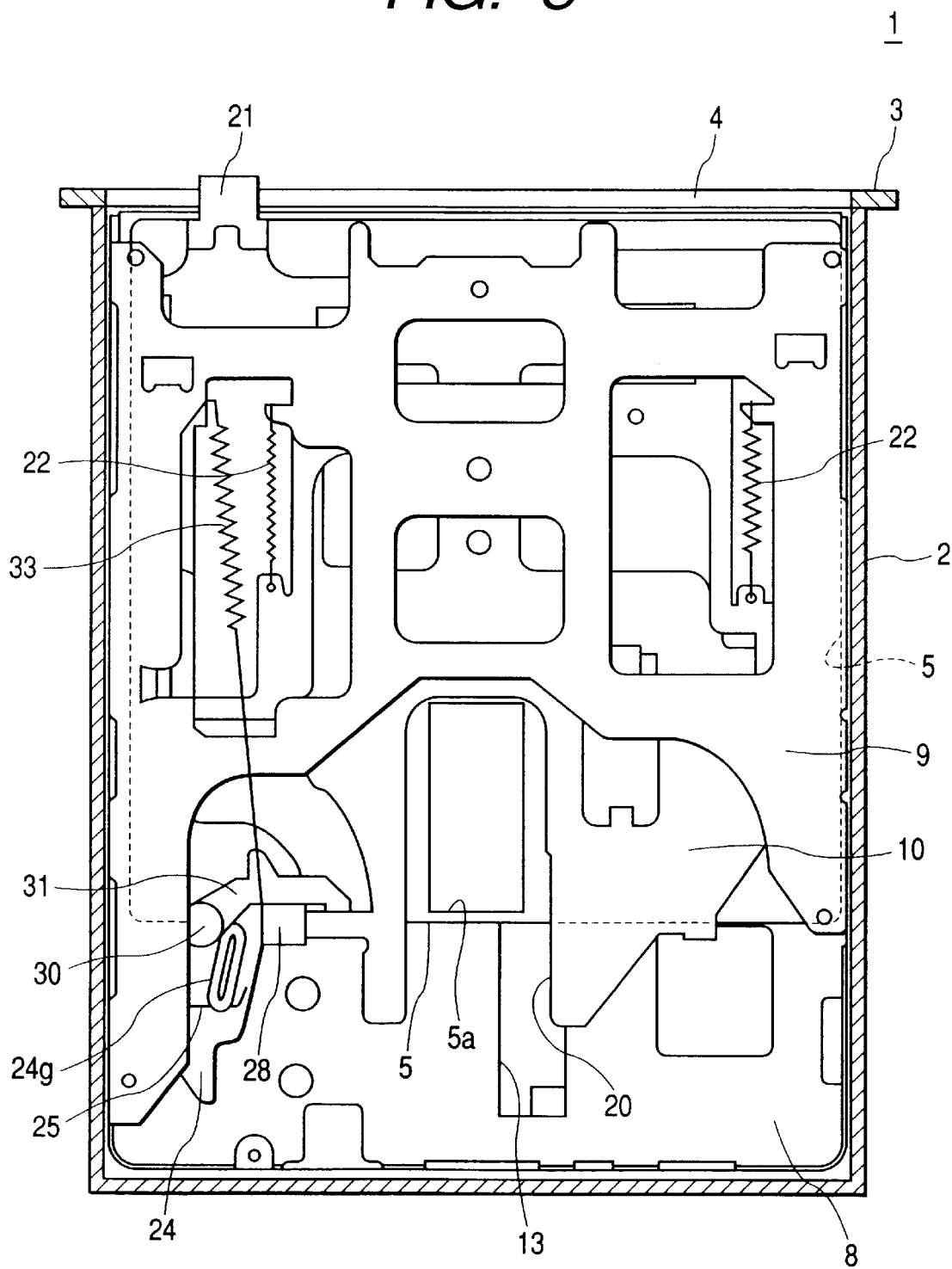
FIG. 3 is a plan view of the floppy disk drive according to the embodiment of the invention showing a state where a disk cartridge is loaded in which the casing is cut away.

The embodiment of the invention will be explained in detail with reference to the accompanying drawings. In the following explanation, with respect to the expressions of upper and lower, left and right and front and rear, it is supposed that front and rear represent upper and lower direction and upper and lower represent direction perpendicular to the drawing sheets, with reference to FIG. 1. An apparatus shown in the drawings as an embodiment is housed within a casing 2 of an angular cylindrical shape which is omitted in its details as shown in FIG. 1. A disk cartridge 5 housing a floppy disk of 3.5 inch therein as shown in FIG. 3 is loaded from a cartridge loading opening 4 formed at a front panel 3 attached to the front surface of the casing 2.

Although the detailed explanation is omitted, the disk cartridge 5 is arranged to house the floppy disk so as to freely rotate within a cartridge of a thin box shape formed by combining upper and lower cartridge halves. The disk cartridge 5 is arranged in a manner that at the center portion of the lower cartridge half, a circular opening portion is formed so as to face a center hub to the outside which fits with the center portion of the floppy disk housed therein. The disk cartridge 5 is further arranged in a manner that the pair of cartridge halves are provided with. recording/reproducing opening portions 5a (see FIG. 3) for facing arts of the major and rear surfaces of the floppy disk to the outside from the outer peripheral portion to the inner peripheral portion thereof. A shutter member is assembled to the disk cartridge 5 so as to be able to slide freely such that the shutter member is provided with a property for closing the recording/reproducing opening portions by a spring etc.

The disk cartridge 5 is arranged in a manner that when it is loaded in the floppy disk drive 1, the shutter member is slid to open the recording/reproducing opening portions, as described later.

The floppy disk drive 1 includes a pair of upper and lower magnetic heads 6 described later thereby to record and reproduce information signal etc. on and from the major and rear surfaces of the floppy disk, and also transmit and receive the information signal etc. to and from the main body apparatus through an input/output connector 7 additionally provided at the rear surface of the casing 2.

Figure 2:
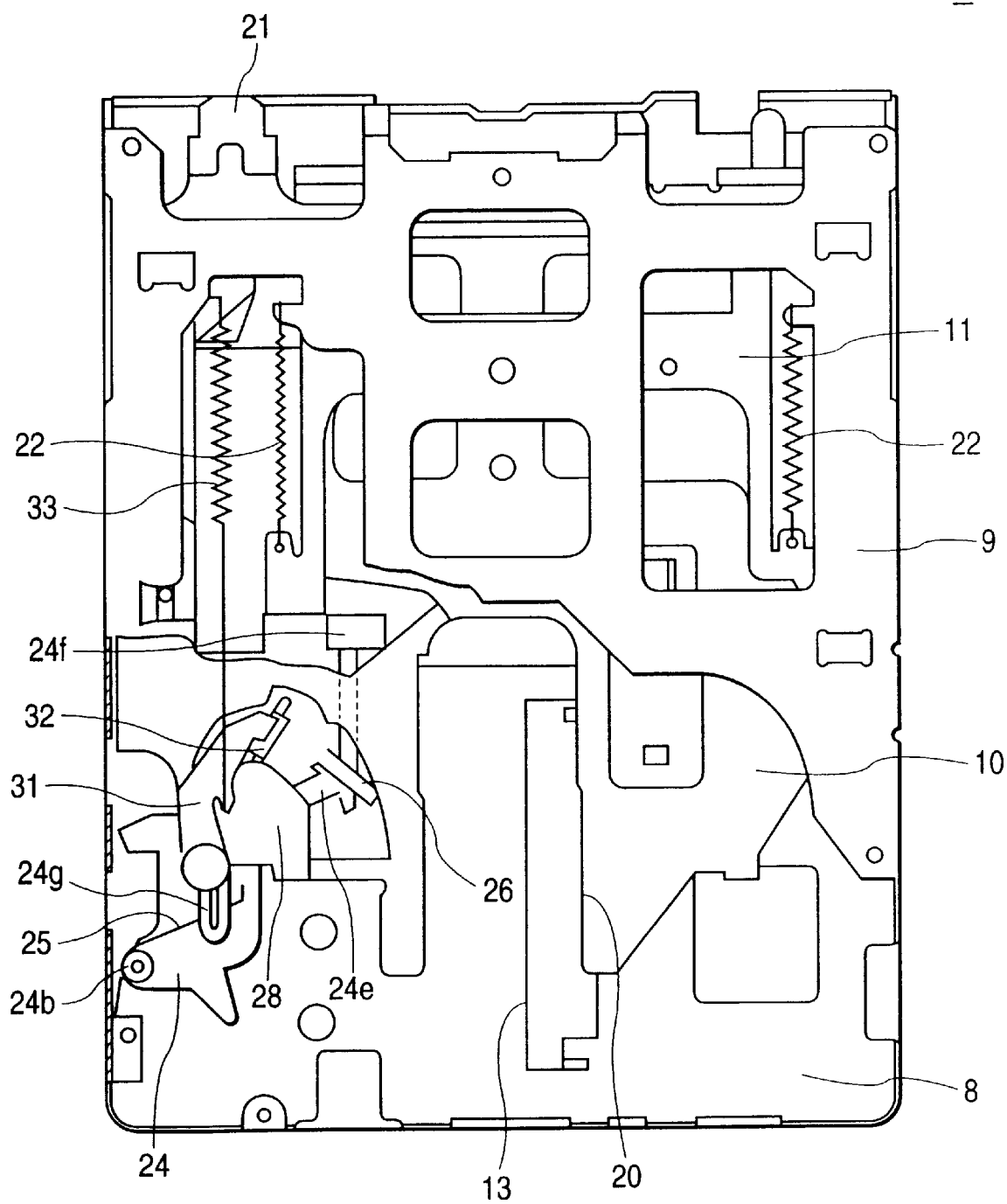
FIG. 2 is a plan view of a main portion of the floppy disk drive according to the embodiment of the invention in. which the rear end portion of an upper chassis is cut away to show the inner structure thereof.

As shown in FIGS. 1 to 3, like the prior art, the floppy disk drive 1 includes members formed by a thin metal plate such as a lower chassis 8, an upper chassis 9, a cartridge holder 10, and an eject plate member 11 etc. Although not shown, in the floppy disk drive 1, a print board on which ICs or electronic parts etc. constituting a control circuit, a signal processing circuit, a power supply circuit etc. is assembled on the bottom surface of the lower chassis 8. The lower chassis 8 is a member of an almost plate shape in its entirety to which rising side walls are integrally formed by being bent along both the side surfaces and the rear surface (the lower side in FIG. 1). Although the detailed explanation is omitted, the lower chassis 8 is integrally provided at the rising side walls thereof with various kinds of cam grooves, attachment pieces etc. for restricting the sliding operation of the cartridge holder 10 and the eject plate member 11.

The lower chassis 8 is provided with a circular opening portion 12 (see FIG. 4) positioned in an area slightly front side from the center portion in FIG. 1 and further provided with a rectangular opening portion 13 extending in the front/rear direction in a rear area corresponding to the circular opening portion 12. The lower chassis 8 is further provided with a guide convex portion 14 of a pedestal shape which is formed by bending the periphery of the circular opening portion 12 so as to protrude inward.

In the floppy disk drive 1, a driving motor 15 is attached to the bottom surface side of the lower chassis 8 at the position corresponding to the circular opening portion 12 as shown by a chain line in FIG. 1. The floppy disk drive 1 is further provided with a disk table 16 fixed to the output shaft of the driving motor 15. The disk table 16 faces on the inner portion through the circular opening portion 12 of the lower chassis 8 and magnetically chucks. the center hub of the floppy disk loaded thereby to position and hold the disk. The floppy disk drive 1 is arranged to drive the driving motor 15 in a state where the floppy disk is held by the disk table 16 thereby to rotate the floppy disk at a predetermined speed.

In the floppy disk drive 1, an area at the slightly rear side from the center portion in FIG. 1 where the aforesaid rectangular opening portion 13 is formed disk on constituted as a recording/reproducing portion 17. A head mechanism 18 having a pair of upper and lower magnetic heads 6 (6a, 6b) is disposed in the recording/reproducing portion 17. Although not shown, the floppy disk drive 1 is provided with a head driving mechanism having a head driving motor for moving the head mechanism 18 upward and downward in FIG. 1, a guide mechanism etc.

Although detailed explanation is omitted, the head mechanism 18 is formed by the respective magnetic heads 6, carriages 19 (19a, 19b) for supporting these magnetic heads 6 through gimbal springs, respectively, or the like. The head mechanism 18 serves to position the carriages 19 so as to oppose to each other through the floppy disk loaded at the recording/reproducing portion 17. In this state, the head mechanism 18 also serves to position the magnetic heads 6 so as to oppose to the recording/reproducing opening portions formed on the major and rear surfaces of the disk cartridge 5, respectively. When the recording or reproducing operation is performed, the head mechanism 18 serves to have the magnetic heads 6 contact to the major and rear surfaces of the floppy disk through the recording/reproducing opening portions, respectively, so that information signal etc. is recorded on or reproduced from the major and rear surfaces of the floppy disk.

The upper chassis 9 is combined with the lower chassis 8 so as to oppose to each other thereby to constitute a cartridge loading space portion having a height slightly larger than the thickness of the disk cartridge 5 together with the lower chassis. The upper chassis 9 is configured to have a large notch portion of an almost arc shape at the lower portion thereof corresponding to the recording/reproducing portion 17 as shown in FIG. 1 thereby to face the upper carriage 19b of the head mechanism 18 disposed at the rear portion of the aforesaid lower chassis 8 on the recording/reproducing portion 17.

The cartridge holder 10 is configured by a member of an almost plate shape to which rising side walls having a height slightly higher than the thickness of the disk cartridge 5 are integrally formed by being bent along both the side surfaces. The cartridge holder is combined with the lower chassis 8 so as to slide freely in the front and rear direction in FIG. 1 along the rising peripheral walls of the lower chassis. The cartridge holder 10 operates so as to move to the bottom surface side of the lower chassis. 8 in a state where the disk cartridge 5 reaches the position corresponding to the recording/reproducing portion 17. The cartridge holder 10 is provided with a notched groove 20 extending in the front and rear direction at the rear position thereof corresponding to the recording/reproducing portion 17 as shown in FIG. 1. The cartridge holder 10 serves to have the upper carriage 19b constituting the head mechanism 18 on the recording/reproducing portion 17 through the notched groove 20.

The eject plate member 11 is a member of an almost plate shape to which rising side walls are integrally formed by being bent along both the side portions and combined with the upper chassis so as to slide freely in the front and rear direction along the inner surface of the upper chassis 9. An eject operation convex portion 21 is integrally formed at the front end portion of the eject plate member 11. Although detailed explanation is omitted, each of the eject plate member 11 and the cartridge holder 10 is suitably provided with a cam groove, an engagement portion etc. on the rising side walls thereof thereby to perform a predetermined sliding operation together with a cam groove and an engagement portion formed on each of the rising side walls of the lower chassis 8 and the upper chassis 9.

The eject plate member 11 and the cartridge holder 10 are arranged in a manner that when the disk cartridge 5 is loaded and pushed in, the cartridge holder 10 performs an elevation operation in an interlocking manner with the sliding operation of the eject plate member 11. The eject plate member 11 is biased to the front side by a pair of left and right eject springs 22 which are hung between the upper chassis 9 and the eject plate member . The eject springs 22 bias the cartridge holder 10 to the front side through the eject plate member 11.

Figure 4:
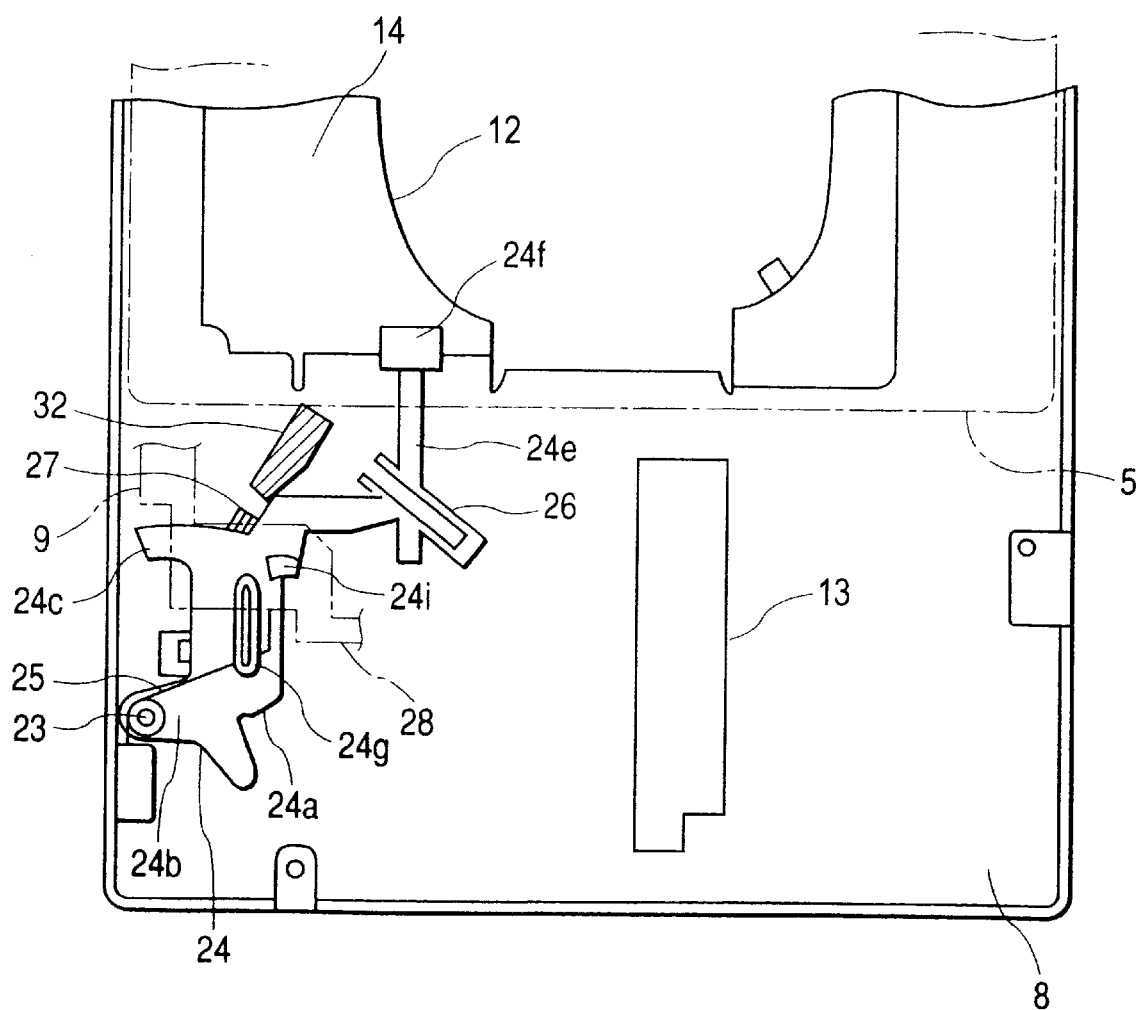
FIG. 4 is a plan view of a main portion of the floppy disk drive according to the embodiment of the invention for explaining the operation of a cam plate member provided therein and showing a state where the disk cartridge is on the way of being loaded.
Figure 5:
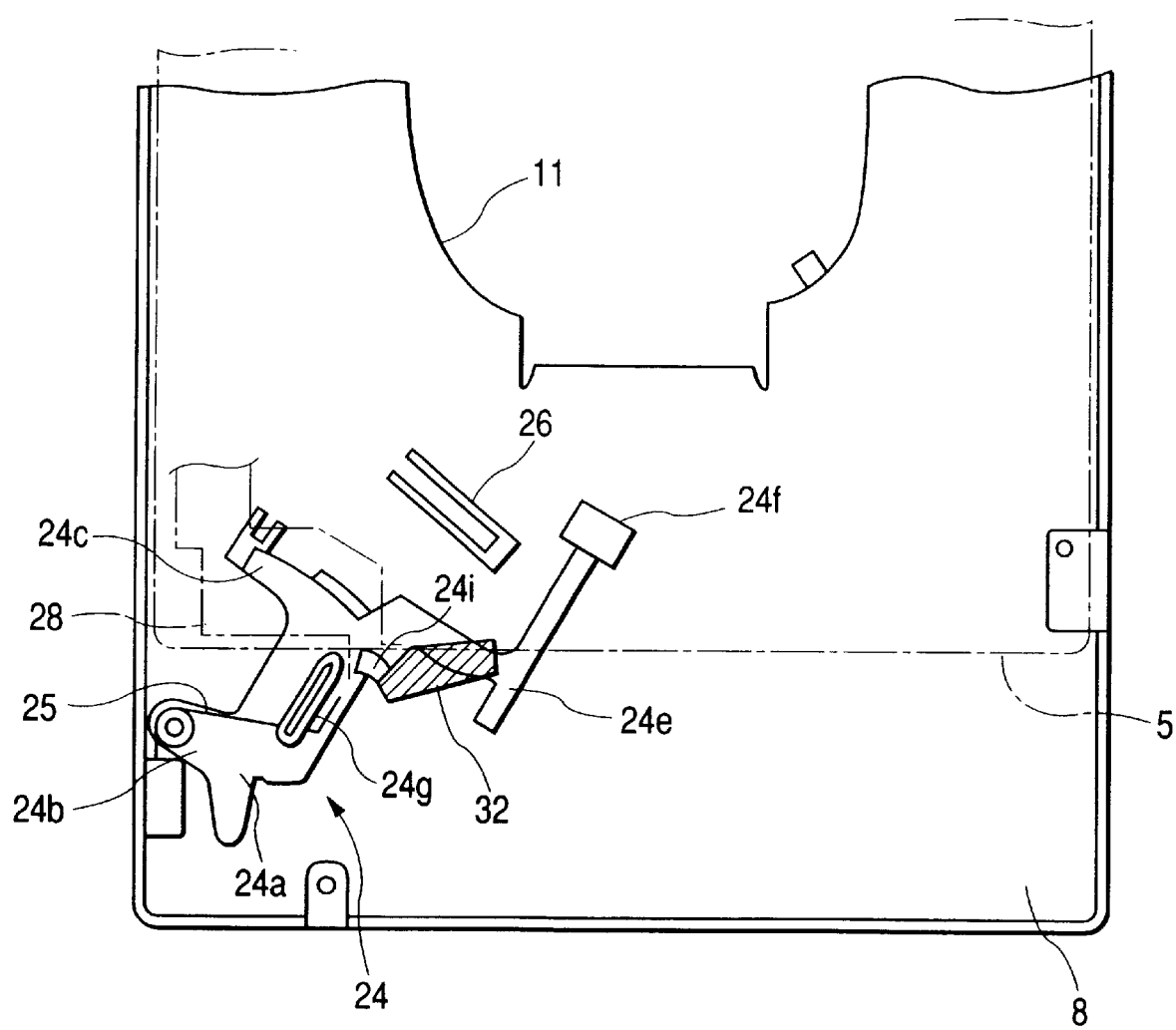
FIG. 5 is a plan view of the main portion of the floppy disk drive according to the embodiment of the inventor for explaining the operation of the cam plate member provided therein and showing a state where the disk cartridge has been loaded to a recording/reproducing portion.
Figure 6:
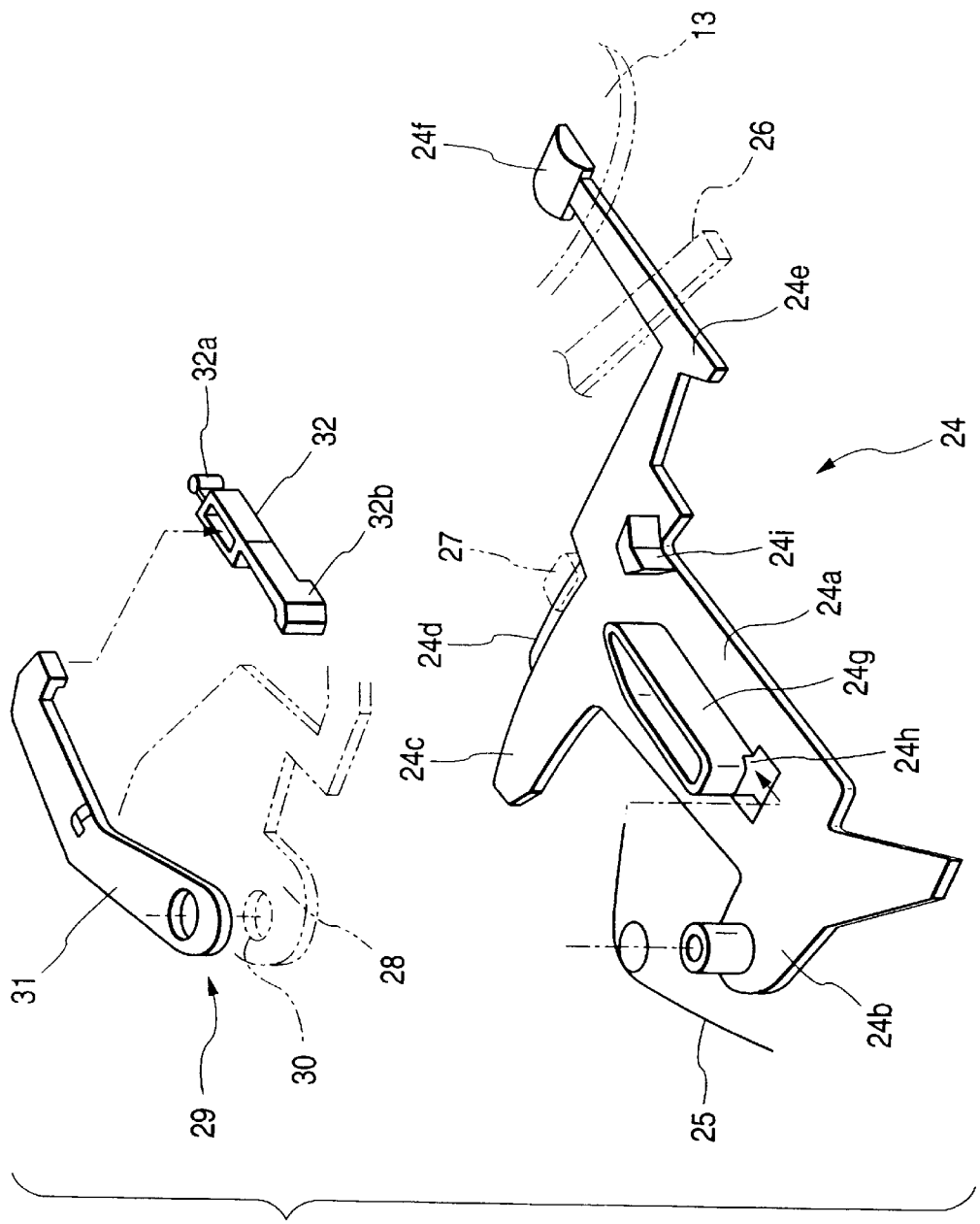
FIG. 6 is an exploded perspective view of the main portion of the floppy disk drive according to the embodiment of the invention for explaining the configuration of the cam plate member provided therein.
Figure 7A:
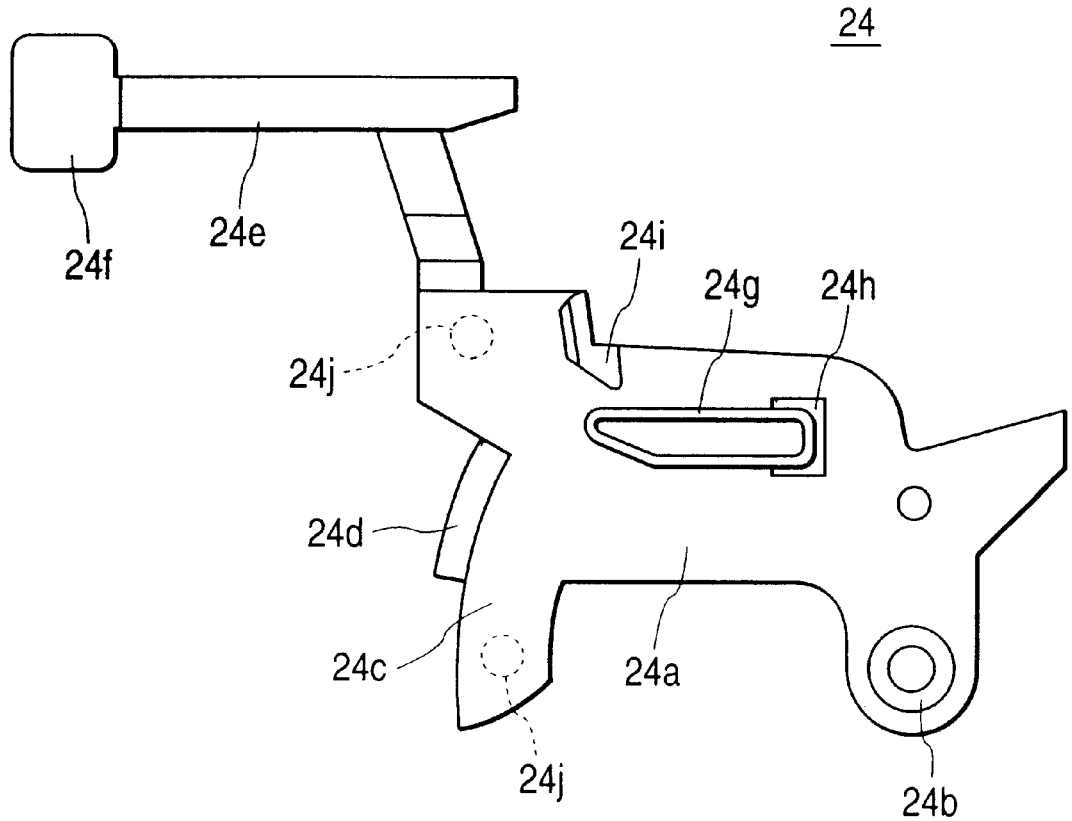
FIGS. 7A and 7B are diagrams showing the cam plate member, wherein (A) and (B) represent the plan view and the side view thereof, respectively.
Figure 7B:
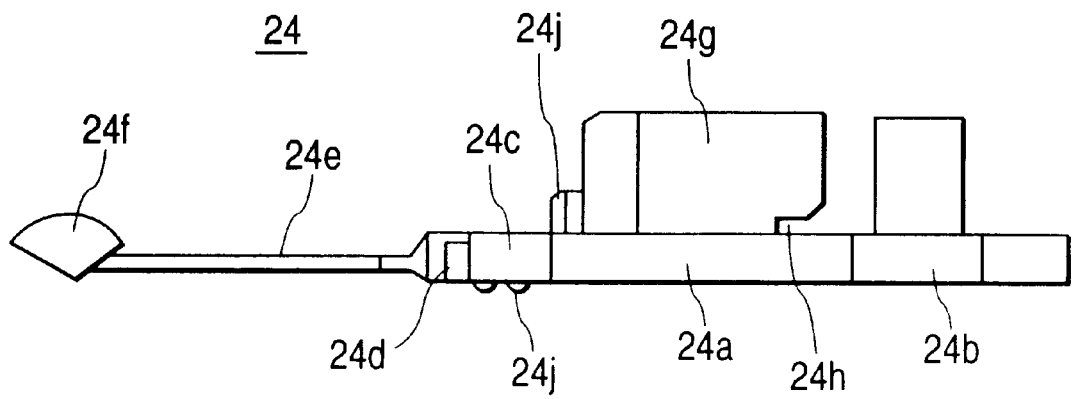

A spindle 23 is erected on the bottom surface of the lower chassis 8 at the side portion of the recording/reproducing portion 17 as shown in FIGS. 2, 4 and 5, and the cam plate member 24 is supported by the spindle 23 so as to rotate freely. A fulcrum portion 24b having a shaft hole at the one side edge on the rear side of a main body portion 24a of an almost rectangular shape in its entirety is integrally and protrusively provided at the cam plate member 24 as shown in FIGS. 6 and 7. In the cam plate member 24, a first cam convex portion 24c of an arc shape is protrusively and integrally provided at the side edge on the front side of the many body portion 24a opposing to the fulcrum portion 24b. A guide cam portion 24d with a slightly thin thickness is formed at the front side edge of the first cam convex portion 24b.

An elastic cam lever portion 24e is protrusively and integrally provided at the other side edge on the front side of the main body portion 24a of the cam plate member 24. The elastic cam lever portion 24e is a portion of an L-shape in its entirety having a thin thickness and able to shift freely and elastically in its thickness direction. A cam convex portion 24f of a fan shape in its section is integrally formed at the tip end portion of the elastic cam lever portion 24e. A second cam convex portion 24g of an almost rectangular cylindrical shape is protrusively and integrally provided on the major surface of the main body portion 24a of the cam plate member 24. The second cam convex portion 24g is provided at the rear end portion thereof with a spring hanging portion 24h which is formed by a notching process. The cam plate member 24 is further provided on the major surface of the main body which integrally formed at the root portion of the elastic cam lever portion 24e. Click convex portion 24j of arc shapes in their sections are integrally formed on the bottom surfaces of the main body portion 24a and the first cam convex portion 24c of the cam plate member 24, respectively.

The spindle 23 is fitted into the shaft hole of the fulcrum portion 24b so that the cam plate member 24 is supported by the lower chassis 8 so as to rotate freely in an overhang state. The cam plate member 24 is biased counterclockwise in FIG. 2 by a torsion spring 25 which is configured in a manner that a coil portion thereof is attached to the fulcrum portion 24b, one end portion thereof is abutted against the lower chassis 8 and the other end portion is hung at the spring hanging portion 24h.

In the state where the disk cartridge 5 is not loaded, the cam plate member 24 is held in a state as shown in FIG. 2. that the elastic cam lever portion 24e is elastically deviated and the cam convex portion 24f at the tip end portion of the elastic cam lever portion moves onto the guide convex portion 14 of the lower chassis 8. Of course, the cam convex portion 24f is formed so that the distance between the cam convex portion and the upper chassis 9 is held at a size slightly larger than the thickness of the disk cartridge 5. The cam convex portion 24f is positioned within the loading space portion of the disk cartridge 5. In this state, the cam plate member 24 is held in a manner as shown in FIG. 4 that the elastic cam lever portion 24e enters into the first hold convex piece 26 formed by raising a part of the lower chassis 8. Further. the cam plate member 24 is held in a manner as shown in FIG. 4 that the guide cam portion 24d enters into a second hold convex piece 27 formed by raising a part of the lower chassis 8.

As described in detail later, when the disk cartridge 5 is loaded, the cam plate member 24 holds the disk cartridge in a state that the disk cartridge is pushed up by the cam convex portion 24f at the tip end portion of the elastic cam lever portion 24e until the disk cartridge 5 is pushed to the position corresponding to the recording/reproducing portion 17. As described in detail later, the cam plate member 24 holds on the upper surface of the second cam convex portion 24g a lever support portion 28 described later which is formed at the rear end portion of the cartridge holder 10 as shown in FIG. 2 at the time of not-using or until the disk cartridge 5 is loaded and pushed to the position corresponding to the recording/reproducing portion 17. The cam plate member 24 serves to hold a shutter opening mechanism 29 described later by the third cam convex portion 24i thereby to hold the shutter member of the disk cartridge 5 in an opened state.

The shutter opening mechanism 29 for opening the shutter member of the disk cartridge 5 thus loaded is supported by the lever supporting portion 28. As shown in FIG. 2, the shutter opening mechanism 29 is constituted by a driving lever 31 which is supported by the spindle 30 erected from the lever supporting portion 28 so as to rotate freely in an overhang state, a shutter opening cam member 32 attached to the tip end portion of the driving lever 31, and a shutter lever spring 33 hung over between the driving lever 31 and the cartridge holder 10. and so on. Although a detailed explanation is omitted, the shutter opening mechanism 29 is arranged in a manner that the operating cam portion 32a of the shutter opening cam member 32 abuts against the one end of the shutter member when the disk cartridge 5 is loaded and pushed in.

The shutter opening mechanism 29 is arranged in a manner that when the disk cartridge 5 is further pushed in, the driving lever 31 rotates clockwise in the figure against the elastic force of the shutter lever spring 33 and the operating cam portion 32a of the shutter opening cam member 32 pushes the shutter member thereby to open the shutter member. The shutter opening mechanism 29 is further arranged in a manner that the holding cam portion 32b of the shutter opening cam member 32 faces with and engages with the third cam convex portion 24i of the cam plate member 24 and then is stopped as shown in FIG. 5 thereby to hold the shutter member in the opened state.

The floppy disk drive 1 configured in the aforesaid manner operates in a manner that in the state where the disk cartridge 5 is not loaded as shown in FIGS. 1 and 2, the cam convex portion 24f of the cam plate member 24 moves onto the guide convex portion 14 of the lower chassis 8 and extends within the loading space portion of the disk cartridge 5 constituted between the lower chassis 8 and the upper chassis 9. In the floppy disk drive 1, the disk cartridge 5 is loaded from the cartridge loading opening 4 of the front panel 3. The disk cartridge 5 is loaded into the cartridge loading opening 4 from the side surface portion side as the tip portion at which the shutter member is assembled.

In the floppy disk drive 1, the disk cartridge 5 abuts against the cam convex portion 24f of the cam plate member 24 as the disk cartridge is pushed into the loading space portion and then moves onto the cam convex portion 24f along the fan shaped configuration thereof. In other words, the disk cartridge 5 is pushed into the loading space portion in a state that the disk cartridge is pushed up to the upper chassis 9 side by the cam convex portion 24f of the cam plate member 24. In the floppy disk drive 1, when the disk cartridge 5 is still pushed in even after the disk cartridge abuts at its tip side surface against the shutter opening cam member 32, the driving lever 31 is rotated clockwise in FIG. 1 through the shutter opening cam member 32 against the elastic force of the shutter lever spring 33. The disk cartridge 5 operates such that the shutter member is pushed by the operating cam portion 32a of the shutter opening cam member 32 and performs the sliding operation thereby to gradually open the recording/reproducing opening portion.

In the floppy disk drive 1, when the cartridge 5 is further pushed in, the tip side surface of the disk cartridge abuts against the tip side surface of the second cam convex portion 24g of the cam plate member 24 to push the second cam convex portion. Thus, the cam plate member 24 rotates gradually clockwise in FIG. 1 against the elastic force of the torsion spring 25. In the floppy disk drive 1, the holding cam portion 32b of the shutter opening cam member 32 moves onto the main body portion 24a of the cam plate member 24, whereby the shutter opening cam member further rotates to open the shutter member of the disk cartridge 5. The floppy disk drive 1 operates to hold the pushing-up state of the disk cartridge 5 by the cam convex portion 24f of the cam plate member 24.

In the floppy disk drive 1, when the disk cartridge 5 is pushed into the position corresponding to the recording/reproducing portion 17, the cartridge holder 10 slides to the lower chassis 8 side through a coupling cam mechanism which is provided between the respective lower chassis 8, upper chassis 9 and the cartridge holder 10 and the detailed explanation thereof is omitted. Thus, as shown in FIG. 3, in the floppy disk drive 1, the disk cartridge 5 is loaded to the recording/reproducing portion 17 and the center hub of the floppy disk is magnetically chucked by the disk table 16. Then, the floppy disk drive 1 operates such that the respective magnetic heads 6 move in from the recording/reproducing opening portion thus opened of the disk cartridge 5 and contact with the major surfaces of the floppy disk.

In the floppy disk drive 1, at the time of loading the aforesaid disk cartridge 5 in the recording/reproducing portion 17, a not-shown cam member formed at the eject plate member 11 engages with the first cam convex portion 24c of the cam plate member 24 to hold the first cam convex portion. The cam plate member 24 holds the shutter opening cam member 32 in a manner that in accordance with the termination of the loading operation of the disk cartridge 5 into the recording/reproducing portion 17, the holding cam portion 32b having moved over the main body portion 24a opposes to and engages with the third cam convex portion 24i thereby to hold the shutter opening cam member 32.

The cam plate member 24 moves to the bottom surface side in accordance with the rotating operation thereof from the state where the cam convex portion 24f moves onto the guide convex portion 14 of the lower chassis 8, but still holds the pushing-up state of the disk cartridge 5. Thus, in the floppy disk drive 1, even when the opposed distance between the disk cartridge 5 and the magnetic heads 6 is not held to a sufficient value due to the thinning of the apparatus, both the disk cartridge and the magnetic heads can be surely kept to be separated. As a result, such an inconvenient problem that the magnetic heads 6 abut against the disk cartridge 5 on the way of the loading so as to break the heads can be prevented. The cam plate member 24 operates in a manner that when the disk cartridge 5 is pushed in to the position corresponding to the recording/reproducing portion 17 and the cartridge holder 10 slides to the lower chassis 8 side, the elastic cam lever portion 24e is elastically deviated thereby to also enable the loading operation of the disk cartridge 5.

As described above, in the floppy disk drive 1, the second cam convex portion 24g of the cam plate member 24 supports the lever supporting portion 28 of the cartridge holder 10. Thus, the cartridge holder 10 can be prevented from being deformed with respect to a load such as vibration etc. even if the cartridge holder is formed by a metal plate of thin thickness so as to cope with the requirement for light-weight and thin thickness. As a result, in the floppy disk drive 1, even when the opposed distance between the disk cartridge 5 and the magnetic heads 6 becomes narrow, both the disk cartridge and the magnetic heads can be surely kept to be separated. Thus, such an inconvenient problem that the magnetic heads 6 abut against the disk cartridge 5 on the way of the loading so as to break the heads can be surely prevented.

The cam plate member 24 rotates by a predetermined angle as shown in FIGS. 3 and 5 in the state where the disk cartridge 5 is pushed in to the position corresponding to the recording/reproducing portion 17, so that the second cam convex portion 24g is disposed away from the lever supporting portion 28. Thus, the cartridge holder 10 is able to slide to the lower chassis 8 side as described above.

The floppy disk drive 1 is operated in a manner that the recording operation or the reproducing operation is performed on the main apparatus in the state where the loading operation of the disk cartridge 5 to the recording/reproducing portion 17 is completed. In the floppy disk drive 1, the information signal etc. is recorded on the floppy disk and the information signal etc. thus recorded on the floppy disk is reproduced therefrom by using the magnetic heads 6.

In the floppy disk drive 1, when the eject operation convex portion 21 is pushed to push in the eject plate member 11, the disk cartridge is ejected. The floppy disk drive 1 operates in a manner that due to the ejecting operation, the respective constructive members restore to the initial positions and the rear end portion of the disk cartridge 5 protrudes from the cartridge loading opening 4. In the floppy disk drive 1, the cam plate member 24 thus restored to the initial position serves to hold the lever supporting portion 28 of the holder 10 by means of the second cam convex portion 24g. Further, the cam plate member 24 operates such that the elastic cam lever portion 24e elastically deviates so that the cum convex portion 24f moves onto the guide convex portion 14 of the lower chassis 8 to restore to the initial state.

As described above in detail, according to the floppy disk drive of the invention, the elastic cam lever portion of the cam plate member holds the riding state of the disk cartridge onto the guide convex portion of the chassis thereby to push up the disk cartridge by the cam portion formed at the elastic cam lever portion until the disk cartridge is loaded to the recording/reproducing portion from the loading portion, so that the disk cartridge can be surely held in a separated state from the magnetic head. Thus, the magnetic head is prevented from being broken due to hitting etc. with the disk cartridge. Further. according to the floppy disk drive. since the cam convex portion of the cam plate member holds the disk cartridge until the disk cartridge is loaded to the position corresponding to the recording/reproducing portion from the loading portion, the occurrence of the bending of the cartridge holder is suppressed even if vibration or impact etc. is applied to the cartridge holder thereby to prevent the occurrence of the breakage of the magnetic head due to hitting etc. with the disk cartridge. Thus, according to the invention, not only the number of the parts and the number of assembling processes can be reduced, but also such an inconvenience problem that the magnetic head hits with the disk cartridge and is broken at the time of loading etc. of the disk cartridge can be prevented from occurring. Accordingly, the floppy disk drive which can be improved in reliability and miniaturized in size and reduced in thickness is realized.

What is claimed is:

1. A floppy disk drive comprising:

a cum plate member supported by a lower chassis so as to rotate freely and rotates in accordance with an inserting/ejecting operation of a disk cartridge, said cum plate member integrally provided with an elastic cum lever portion and a cum convex portion, said elastic cum lever portion pushing up said disk cartridge being loaded in a manner of being moved onto a guide convex portion formed on said lower chassis and holding the pushing-up state of said disk cartridge until said disk cartridge moves to a position corresponding to a recording/reproducing portion, said cum convex portion pushing up and holding a part of said cartridge holder which holds and loads said disk cartridge from a loading portion to said recording/reproducing portion.

2. A floppy disk drive as claimed in claim 1, wherein said elastic cum lever portion pushes up said disk cartridge until said disk cartridge is loaded to said recording/reproducing portion from said loading portion thereby to maintain a non-contact state of said disk cartridge with a magnetic head, and said cum convex portion holds said cartridge holder to suppress bending of said cartridge holder until said disk cartridge is loaded to said recording/reproducing portion and in a non-loaded state of said disk cartridge.

* * * * *